United States Patent [19]

Collins et al.

[11] 4,124,490

[45] Nov. 7, 1978

[54] HYDROCARBON REFORMING PROCESS

[75] Inventors: Thomas A. Collins, Country Club Hills; Andrew P. Voss, South Holland, both of Ill.

[73] Assignee: Atlantic Richfield Company, Philadelphia, Pa.

[21] Appl. No.: 773,582

[22] Filed: Mar. 2, 1977

[51] Int. Cl.$^2$ .............................................. C10G 35/08
[52] U.S. Cl. ....................................... 208/139; 208/65; 208/138
[58] Field of Search ........................... 208/65, 138, 139

[56] References Cited

U.S. PATENT DOCUMENTS

| 2,904,503 | 9/1959 | Welty et al. | 208/65 |
|---|---|---|---|
| 2,910,430 | 10/1959 | Bock et al. | 208/138 |
| 2,943,999 | 7/1960 | Moore et al. | 208/139 |
| 3,415,737 | 12/1968 | Kluksdahl | 208/139 |
| 3,449,237 | 6/1969 | Jacobson et al. | 208/138 |
| 3,650,944 | 3/1972 | McCoy et al. | 208/138 |

Primary Examiner—C. Davis
Attorney, Agent, or Firm—Frank J. Uxa

[57] ABSTRACT

An improved hydrocarbon reforming process comprising:

1. contacting a hydrocarbon feed with a platinum group metal, rhenium-containing catalyst in the presence of hydrogen in at least one reaction zone at a temperature in the range of about 500° F. to about 650° F. for a time sufficient to improve the catalytic activity stability of the catalyst; and thereafter, 2. contacting the hydrocarbon chargestock with the catalyst in the presence of hydrogen at hydrocarbon reforming conditions including a higher temperature than the temperature at which step (1) occurred.

10 Claims, No Drawings

HYDROCARBON REFORMING PROCESS

This invention relates to a new and improved hydrocarbon reforming process. More particularly, the invention relates to an improved process which involves utilizing a catalyst comprising at least one platinum group metal and rhenium to promote reforming of a hydrocarbon feedstock.

The use of catalysts comprising minor amounts of at least one platinum group metal and rhenium on a major amount of porous support, e.g., alumina, to promote hydrocarbon reforming has previously been disclosed. One advantage of using such a catalyst in hydrocarbon reforming is the high degree of catalyst activity stability achieved. That is, catalysts containing both platinum group metal and rhenium have been shown to have greater catalytic activity stability, i.e., an ability to process hydrocarbon for longer periods of time between catalyst regenerations, than catalysts which contain only platinum group metal without rhenium. However, it would be advantageous to further improve the catalytic activity stability of such platinum group metal, rhenium-containing catalysts.

Therefore, one object of the present invention is to provide an improved hydrocarbon reforming process.

Another object of the present invention is to provide an improved hydrocarbon reforming process employing a platinum group metal, rhenium-containing catalyst and obtain improved catalytic activity stability. Other objects and advantages of the present invention will become apparent hereinafter.

An improved process has been found wherein hydrocarbon is contacted with a catalyst comprising a major amount of a porous solid support, e.g., alumina, a minor, catalytically effective amount, preferably about 0.01% to about 3.0% by weight, of at least one platinum group metal component and a minor, catalytically effective amount, preferably about 0.01% to about 5.0% by weight, of at least one rhenium component in the presence of hydrogen at reforming conditions. The improved process comprises:

1. contacting a hydrocarbon feed with a catalyst, as described hereinabove, in the presence of hydrogen in at least one reaction zone at hydrocarbon reforming conditions including a temperature in the range of about 500° F. to about 650° F., preferably about 550° F. to about 650° F., for a time sufficient to improve the catalytic activity stability of the catalyst, preferably for at least about 0.1 hour more preferably for a time in the range of about 0.5 hour to about 48 hours and still more preferably for about 0.5 hour to about 24 hours; and thereafter, 2. contacting the hydrocarbon chargestock with the catalyst in the presence of hydrogen at hydrocarbon reforming conditions including a higher temperature than the temperature at which step (1) occurred, preferably in the range of about 700° F. to about 1100° F., and more preferably about 800° F. to about 1050° F.

According to step (1) of the present invention, a hydrocarbon feed is contacted with a catalyst of the type described above in the presence of hydrogen in at least one reaction zone for a time sufficient to improve the catalytic activity stability of the catalyst in the present process, in particular, as is manifested in step (2) of this process.

Step (2) of the present invention occurs after step (1) and involves contacting a hydrocarbon chargestock with the catalyst such as described above in the presence of hydrogen in at least one reaction zone at hydrocarbon reforming conditions, including, reaction temperature higher than the temperature at which step (1) occurred, preferably in the range of about 700° F. to about 1100° F. Practicing this process has been found to provide unexpected advantages, e.g., improved catalytic activity stability and prolonged catalyst cycle length, relative to, for example, a process in which catalyst is initially contacted with hydrocarbon chargestock at temperatures ranging from about 700° F. to about 1100° F.

The present process may be accomplished by using the catalyst in any conventional reaction zone system, e.g., a fixed bed system, a moving bed system, a fluidized bed system, or in a batch type operation. However, in view of the danger of attrition losses of the valuable catalyst and of well-known operational advantages, it is preferred to use a fixed bed system. In this system, hydrogen-rich gas and the hydrocarbon are preheated by any suitable heating means to the desired reaction temperature and then are passed into at least one reaction zone containing a fixed bed of the catalyst as hereinabove characterized. It is understood that the reaction system may include one or more separate reaction zones with suitable means there between to compensate for the net endothermic nature of the reactions that take place in each catalyst bed and thus insure that the desired reaction temperature is maintained at the entrance to each reactor. The reactants, e.g., hydrocarbon feed or chargestock and hydrogen, may be contacted with the catalyst bed in either upward, downward, or radial flow fashion. In addition, the reactants may be in the liquid phase, a mixed liquid-vapor phase, or a vapor phase when they contact the catalyst, with best results obtained in the vapor phase.

The hydrocarbon feed and chargestock used in the present process comprise hydrocarbon fractions containing naphthenes and paraffins that, preferably boil primarily within the gasoline range. The compositions of the hydrocarbon materials used in steps (1) and (2) may be the same or different. Typically, these hydrocarbon materials may comprise about 20% to about 70% by weight of naphthenes and about 25% to about 75% by weight of paraffins. The preferred hydrocarbons for use as feed and chargestock consists essentially of naphthenes and paraffins, although in some cases aromatics and/or olefins may also be present. When aromatics are included, these compounds comprise about 5% to about 25% by weight of the total hydrocarbon material. A preferred class of hydrocarbon feed or chargestock includes straight run gasolines, natural gasolines, synthetic gasolines and the like. On theother hand, it is frequently advantageous to use as hydrocarbon feed and chargestock thermally or catalytically cracked gasolines or higher boiling fractions thereof, called heavy naphthas. Mixtures of straight run and cracked gasolines can also be used. The gasoline used as hydrocarbon feed and chargestock may be full boiling range gasoline having an initial boiling point within the range of about 50° F. to about 150° F. and an end boiling point within the range of about 325° F. to about 425° F., or may be selected fraction thereof which generally will be a higher boiling fraction commonly referred to as a heavy naphtha — for example, a naphtha boiling in the range of about $C_7$ to about 400° F. In some cases, it is also advantageous to use pure hydrocarbons or mixtures of hydrocarbons that have been extracted from hydrocarbon distillates — for example, a straight-chain paraffin — which are to be converted to aromatics. It is preferred that at least a portion of these hydrocarbon materials used in steps (1) and (2) be treated by conventional pretreatment methods, if necessary, to remove substantially all sulfurous and nitrogenous contaminants therefrom. The hydrocarbon chargestock used in step (2), and preferably in step (1), of the present invention preferably contains less than about 10 ppm, more preferably less than about 5 ppm. and most preferably less than about 1 ppm., by weight of sulfur.

As indicated above, the catalyst utilized in the present invention comprises a solid porous support, e.g., alumina, a platinum group metal and rhenium. It is preferred that the solid porous support be a material comprising a major amount of alumina having a surface area of about 25 m.$^2$/gm. to about 600 m.$^2$/gm. or more. The solid porous support comprises a major proportion, preferably at least about 80%, and more preferably at least about 90%, by weight of the catalyst. The preferred catalyst support, or base, is an alumina derived from hydrous alumina predominating in alumina trihydrate, alumina monohydrate, amorphous hydrous alumina and mixtures thereof, more preferably, alumina monohydrate, amorphous hydrous alumina and mixtures thereof, which alumina when formed as pellets and calcined, has an apparent bulk density of about 0.60 gm./cc. to about 0.85 gm./cc., pore volume of about 0.45 ml./gm. to about 0.70 ml./gm., and surface area of about 100 m.$^2$/gm. to about 500 m.$^2$/gm. The solid porous support may contain, in addition, minor proportions of other well known refractory inorganic oxides such as silica, zirconia, magnesia and the like. However, the most preferred support is substantially pure alumina derived from hydrous alumina predominating in alumina monohydrate.

The alumina support may be synthetically prepared in any suitable manner and may be activated prior to use by one or more treatments including drying, calcination, steaming and the like. Thus, for instance, hydrated alumina in the form of a hydrogel can be precipitated from an aqueous solution of a soluble aluminum salt such as aluminum chloride. Ammonium hydroxide is a useful agent for effecting the precipitation. Control of the pH to maintain it within the values of about 7 to about 10 during the precipitation is desirable for obtaining a good rate of conversion. Extraneous ions, such as halide ions, which are introduced in preparing the hydrogel, can, if desired, be removed by filtering the alumina hydrogen from its mother liquor and washing the filter cake with water. Also, if desired, the hydrogel can be aged, say for a period of several days. The effect of such aging is to build up the concentration of alumina trihydrate in the hydrogel. Such trihydrate formation can also be enhanced by seeding an aqueous slurry of the hydrogel with alumina trihydrate crystallites, for example, gibbsite.

The alumina may be formed into macrosize particles of any shape such as pills, cakes, extrudates, powders, granules, spheres, and the like using conventional methods. The size selected for the macrosize particles can be dependent upon the intended environment in which the final catalyst is to be used — as, for example, whether in a fixed or moving bed reaction system. Thus, for example, where as in the preferred embodiment of the present invention, the final catalyst is designed for use in hydrocarbon reforming operations employing a fixed bed of catalyst, the alumina will preferably be formed into particles having minimum dimension of at least about 0.01 inch and a maximum dimension up to about ½ inch or 1 inch or more. Spherical particles having a diameter of about 0103 inch to about 0.25 inch, preferably about 0.03 inch to about 0.15 inch, are often useful, especially in a fixed bed reforming operation.

As indicated above, the catalyst utilized in the present invention also contains a platinum group metal. The platinum group metals include platinum, palladium, rhodium, iridium, ruthenium, osmium and the like with platinum being preferred for use in the present invention. The platinum group metal, such as platinum, may exist within the final catalyst at least in part as a compound such as an oxide, sulfide, halide and the like, or in the elemental state. Generally, the amount of the platinum group metal component present in the final catalyst is small compared to the quantities of the other components combined therewith. In fact, the platinum group metal component generally comprises from about 0.01% to about 3.0%, preferably from about 0.05% to about 1.0%, by weight of the catalyst, calculated on an elemental basis. Excellent results are obtained when the catalyst contains from 0.2% to about 0.9% by weight of the platinum group metal.

The platinum group component may be incorporated in the catalyst in any suitable manner, such as by coprecipitation or cogellation with the alumina support, ion-exchange with the alumina support and/or alumina hydrogel, or by the impregnation of the alumina support and/or alumina hydrogel at any stage in its preparation and either after or before calcination of the alumina hydrogel. One preferred method for adding the platinum group metal to the alumina support involves the utilization of a water soluble compound of the platinum group metal to impregnate the alumina support prior to calcination. For example, platinum may be added to the support by comingling the uncalcined alumina with an aqueous solution of chloroplatinic acid. Other water-soluble compounds of platinum may be employed as impregnation solutions, including, for example, ammonium chloroplatinate and platinum chloride. The utilization of a platinum-chlorine compound, such as chloroplatinic acid, is preferred since it facilitates the incorporation of both the platinum and at least a minor quantity of the optional halogen component of the catalyst, described hereinafter. It is preferred to impregnate the support with the platinum group metal and rhenium when it is in a hydrous state. Following this impregnation, the resulting impregnated support is shaped (e.g., extruded), dried and subjected to a high temperature calcination or oxidation procedure at a temperature in the range from about 700° F. to about 1500° F., preferably from about 850° F. to about 1300° F., for a period of time from about 1 hour to about 20 hours, preferably from about 1 hour to about 5 hours. The major portion of the optional halogen component may be added to this otherwise fully composited calcined catalyst by contacting this catalyst with a substantially anhydrous stream of halogen-containing gas.

Another essential constituent of the catalyst utilized in the present invention is an additional component exemplified by rhenium. This component may be present as an elemental metal, as a chemical compound, such as the oxide, sulfide, or halide, or in a physical or chemical association with the alumina support and/or the other components of the catalyst. Generally, the rhenium is utilized in an amount which results in a catalyst containing about 0.01% to about 5%, preferably about 0.05% to about 1.0%, by weight of rhenium, calculated as the elemental metal. The rhenium component may be incorporated in the catalyst in any suitable manner and at any stage in the preparation of the catalyst. The procedure for incorporating the rhenium component may involve the impregnation of the alumina support or its precursor either before, during or after the time the other components referred to above are added. The impregnation solution can in some cases be an aqueous solution of a suitable rhenium salt such as ammonium perrhenate, and the like salts or it may be an aqueous solution of perrhenic acid. In addition, aqueous solutions of rhenium halides such as the chloride may be used if desired. It is preferred to use perrhenic acid as the source of rhenium for the catalysts utilized in the present invention. In general, the rhenium component can be impregnated either prior to, simultaneously with, or after the platinum group metal component is added to the support. However, it has been found that best results are achieved when the rhenium component is impregnated simultaneously with the platinum group component. In fact, a preferred impregnation solution contains chloroplatinic acid and perrrhenic acid. In the instance where the catalyst support, e.g., alumina derived from hydrous alumina predominating in alumina monohydrate, is formed into spheres using the conventional oil drop method, it is preferred to add the platinum group metal and rhenium after calcination of the spheroidal particles.

An optional constituent of the catalyst used in the present invention is a halogen component. Although the precise chemistry of the association of the halogen component with the alumina support is not entirely known, it is customary in the art to refer to the halogen component as being combined with the alumina support, or with the other ingredients of the catalyst. This combined halogen may be fluorine, chlorine, bromine, and mixtures thereof. Of these, fluorine and, particularly, chlorine are preferred for the purposes of the present invention. The halogen may be added to the alumina support in any suitable manner, either during preparation of the support, or before or after the addition of the catalytically active metallic components. For example, at least a portion of the halogen may be added at any stage of the preparation of the support, or to the calcined catalyst support, as an aqueous solution of an acid such as hydrogen fluoride, hydrogen chloride, hydrogen bromide and the like or as a substantially anhydrous gaseous stream of these halogen-containing components. The halogen component, or a portion thereof, may be composited with alumina during the impregnation of the latter with the platinum group component and/or rhenium component; for example, through the utilization of a mixture of chloroplatinic acid and/or perrhenic acid and hydrogen chloride. In another situation, the alumina hydrogel which is typically utilized to form the alumina component may containin halogen and thus contribute at least a portion of the halogen component to the final composite. For purposes of the present invention, when the catalyst support is used in the form of an extrudate, and platinum and rhenium are added before extrusion, it is preferred to add the major portion of the halogen component to the otherwise fully composited calcined catalyst by contacting this catalyst with a substantially anhydrous stream of halogen-containing gas. When the catalyst is prepared by impregnating calcined, formed alumina, for example, spheres produced by the conventional oil drop method, it is preferred to impregnate the support simultaneously with the platinum group metal, rhenium component and halogen. In any event, the halogen may be added in such a manner as to result in a fully composited catalyst that contains about 0.1% to about 1.5% and preferably about 0.6% to about 1.3% by weight of halogen calculated on an elemental basis. During both steps (1) and (2) of the present invention, the halogen content of the catalyst can be maintained at or restored to the desired level by the addition of halogen-containing compounds, such as carbon tetrachloride, ethyl trichloride, t-butyl chloride and the like, to the hydrocarbon before entering the reaction zone.

The final fully composited catalyst prepared, for example, by a method set forth above, is generally dried at a temperature of about 200° F. to about 600° F. for a period of about 2 to 24 hours or more and finally calcined at a temperature of about 700° F. to about 1500° F., preferably about 850° F. to about 1300° F. for a period of about 1 hour to about 20 hours and preferably about 1 hour to about 5 hours.

The resultant calcined catalyst may be subjected to reduction prior to use in reforming hydrocarbons. This step is designed to insure chemical reduction of at least a portion of the metallic components.

The reducing media may be contacted with the calcined catalyst at a temperature of about 500° F. to about 1200° F. and at a pressure in the range of about 0 psig. to about 500 psig. and for a period of time of about 0.5 hours to about 10 hours or more and in any event, for a time which is effective to chemically reduce at least a portion, preferably a major portion, of each of the metallic components, i.e., platinum group metal and rhenium component, of the catalyst. In a preferred embodiment, the calcined catalyst is contacted with the reducing media, preferably hydrogen-containing gas, at a temperature within the range of about 500° F. to about 650° F. for a period of time sufficient to effect chemical reduction of at least a portion of the metallic components of the catalyst, preferably for a period of time of about 0.5 hours to about 10 hours. By chemical reduction is meant the lowering of oxidation states of the metallic components below the oxidation state of the metallic component in the unreduced catalyst. For example, the unreduced catalyst may contain platinum salts in which the platinum has an oxidation state which can be lowered or even reduced to elemental platinum by contacting the unreduced catalyst with hydrogen. This reduction treatment is preferably performed in situ, (i.e., in the reaction zone in which it is to be used), as part of a start-up operation using fresh unreduced catalyst or regenerated (e.g., conventionally regenerated by treatment with an oxygen-containing gas stream) catalyst. Thus, the process of the present invention may be practiced using virgin catalyst and/or catalyst that has previously been used to reform hydrocarbon and has been subsequently subjected to conventional treatments to restore, e.g., regenerate and/or reactivate, the hydrocarbon reforming activity and stability of the catalyst.

Hydrocarbon reforming conditions often include a hydrogen to hydrocarbon feed mole ratio in the range of about 4:1 to about 30:1, preferably about 6:1 to about 20:1; reaction pressure in the range of about 50 psig. to about 1000 psig., preferably about 100 psig. to about 600 psig. and more preferably about 200 psig. to about 400 psig.; and a weight hourly space velocity, i.e., WHSV, in the range of about 0.5 to about 10.0 or more, preferably about 1.5 to about 6.0

The following examples illustrate more clearly the processes of the present invention. However, these illustrations are not to be interpreted as specific limitations on this invention.

EXAMPLES I, II AND III

These examples illustrate certain of the benefits of the present invention.

A commercially available catalyst prepared by co-impregnating a gamma alumina support which chloroplatinic acid and perrhenic acid utilizing conventional procedures was selected for testing. This catalyst, comprising 0.35% by weight of platinum (calculated on an elemental basis), 0.35% by weight of rhenium (calculated on an elemental basis) and 1.13% by weight chlorine (calculated on an elemental basis) was placed into a fixed bed reactor. The catalyst was reduced by flowing hydrogen through the reactor at a rate of 2 SCF./hr. for 16 hours at 900° F.

The reduced catalyst was used, in a "once-through", i.e., no hydrogen or hydrocarbon recycle, reforming test to reform a naphtha having the following specifications.

| API Gravity | 54.8 |
|---|---|
| Research Octane Number (clear) | 47.2 |
| Distillation (ASTM D-86) | IBP 230 |
| | 10% 246 |
| | 30% 255 |
| | 50% 267 |
| | 90% 315 |
| | 95% 328 |
| | E.P. 370 |
| Component Type Analysis: | Vol. % |
| Paraffin | 45.4 |
| Naphthene | 42.6 |
| Aromatic | 12.0 |

Naphtha contained essentially no sulfur, i.e., less than 1 ppm.

The reforming conditions were as follows:

| Temperature - | ** |
|---|---|
| WHSV - | 4.0 |
| Pressure - | 200 psig. |
| H$_2$/Hydrocarbon Mole Ratio | 3 |

**The temperature of the reaction zone was maintained at 600° F. as naphtha was initially contacted with the catalyst. After ½ hour the reaction zone temperature was increased to and maintained at 900° F.

Two additional tests were carried out. One additional test was performed using the same procedure as noted previously, except that the catalyst was reduced by flowing hydrogen through the reactor at the rate of 2 SCF./hr. for 16 hours at 600° F. The final test in this series was carried out using the first procedure noted above except that the reaction zone was maintained at 900° F. as naphtha was initially contacted with the catalyst.

Each of these tests were carried out for a sufficient length of time to determine the standard aging rate of the catalyst. Results of these tests were as follows:

| EXAMPLE | I | II | III |
|---|---|---|---|
| Catalyst Reduction Temperature ° F. | 900 | 600 | 900 |
| Initial Naphtha Temperature ° F. | 600 | 600 | 900 |
| **Standard Aging Rates | 2.3 | 2.1 | 3.2 |

**Based upon data correlation techniques known to give reasonable predictions of commercial catalyst aging behavior.

These results show certain of the unexpected benefits of the present process. For example, results derived from practicing the present invention, Examples I and II, show a significantly reduced catalyst aging rate, i.e., improved catalyst activity stability, relative to a process wherein naphtha is initially contacted with the catalyst at 900° F.

EXAMPLES IV AND V

The procedure described in Examples I, II and III above, was carried out except that the catalyst employed contained essentially no rhenium and the reduction temperature was varied as indicated below. Results of these tests were as follows:

| EXAMPLE | IV | V |
|---|---|---|
| Catalyst Reduction Temperature ° F. | 900 | 600 |
| Initial Naphtha Temperature ° F. | 900 | 900 |
| **Standard Aging Rates | 3.8 | 4.0 |

**Based upon data correlation techniques known to give reasonable predictions of commercial catalyst aging behavior.

The results of Examples IV and V indicate that varying catalyst reduction temperature produces essentially no increase in catalyst activity stability when the catalyst does not contain a rhenium component. This is in complete contrast to the results of Examples I, II and III wherein a rhenium-containing catalyst is used and substantial improvement in catalyst activity stability is achieved employing reduced catalyst reduction temperatures and initial naphtha contacting temperatures.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A hydrocarbon reforming process which comprises:
   1. contacting a hydrocarbon feed with a catalyst comprising a major amount of a porous solid support, a minor catalytically effective amount of at least one platinum group metal component and a minor catalytically effective amount of at least one rhenium component in the presence of hydrogen in at least one reaction zone at hydrocarbon reforming conditions including a temperature in the range of about 500° F. to about 650° F. for a time sufficient to improve the catalytic activity stability of said catalyst; and thereafter,
   2. contacting a hydrocarbon feed with said catalyst in the presence of hydrogen at hydrocarbon reforming conditions including a higher temperature than the temperature at which step (1) occurred.

2. The process of claim 1 wherein said contacting of step (1) occurs for at least about 0.1 hour.

3. The process of claim 1 wherein said contacting of step (1) occurs for a time in the range of about 0.5 hour to about 48 hours and the temperature at which the contacting of step (2) occurs is in the range of about 700° F. to about 1100° F.

4. The process of claim 3 wherein said porous solid support comprises a major amount of alumina and step (1) occurs at a hydrogen to hydrocarbon mole ratio of about 4:1 to about 30:1.

5. The process of claim 4 wherein said catalyst comprises about 0.01% to about 3% by weight of at least one platinum group metal component and about 0.01% to about 5.0% by weight of at least one rhenium component.

6. The process of claim 5 wherein said alumina is derived from hydrous alumina predominating in alumina trihydrates, alumina monohydrate, amorphous hydrous alumina and mixtures thereof, and said catalyst further comprises about 0.1% to about 1.5% by weight of halide.

7. The process of claim 6 wherein said contacting of step (1) occurs at a temperature in the range of about 550° F. to about 650° F. and for a time in the range of about 0.5 hour to about 24 hours and said contacting of step (2) occurs at a temperature in the range of about 800° F. to about 1050° F.

8. The process of claim 1 wherein said catalyst is subjected to chemical reduction prior to step (1), said chemical reduction occurring at a temperature in the range of about 500° F. to about 650° F. for a period of time sufficient to effect chemical reduction of at least a portion of the metallic component of said catalyst.

9. The process of claim 3 wherein said catalyst is subjected to chemical reduction prior to step (1), said chemical reduction occurring at a temperature in the range of about 500° F. to about 650° F. for a period of time sufficient to effect chemical reduction of at least a portion of the metallic component of said catalyst.

10. The process of claim 7 wherein said catalyst is subjected to chemical reduction prior to step (1), said chemical reduction occurring at a temperature in the range of about 500° F. to about 650° F. for a period of time sufficient to effect chemical reduction of at least a portion of the metallic component of said catalyst.

* * * * *